J. ISHERWOOD.
WASHER.
APPLICATION FILED MAR. 19, 1913.

1,206,851.

Patented Dec. 5, 1916.

WITNESSES
Victoria Fowler
Marion C. Hobbs

INVENTOR
John Isherwood
BY Ellis Spear Jr.
ATTY.

UNITED STATES PATENT OFFICE.

JOHN ISHERWOOD, OF NEW BEDFORD, MASSACHUSETTS.

WASHER.

1,206,851.     Specification of Letters Patent.     Patented Dec. 5, 1916.

Application filed March 19, 1913. Serial No. 755,417.

*To all whom it may concern:*

Be it known that I, JOHN ISHERWOOD, a citizen of the United States, residing at New Bedford, county of Bristol, Commonwealth of Massachusetts, have invented certain new and useful Improvements in Washers, of which the following is a specification.

This invention relates to washers and particularly to those washers used to unite the meeting ends of pipe and hose couplings, cylinder heads and similar fittings adapted for the transmission of fluids under high pressures and varying temperatures.

I contemplate, in the carrying out of my invention, the use of a washer composed wholly of some flexible material, preferably rubber. This washer has formed upon its inner periphery an annular web somewhat greater in thickness than the thickness of the body of the washer so as to leave a flange projecting laterally from said body at each side. The body of the washer rests on an annular seat formed on one of the pipe fittings and has one of its flanges disposed so as to bear peripherally upon the internal wall of said fitting and its other flange to bear peripherally upon the internal wall of the coöperating fitting when the two fittings are coupled. The internal pressure of the fluid passing through the coupling will expand the flanges of the washer against the walls of the fittings, thus insuring a positively water-tight joint.

The construction and principle of my invention will be more fully disclosed in the specification which follows, and as illustrative of the same I have shown in the accompanying drawing a washer which I have found well adapted for practical use.

Figure 1:
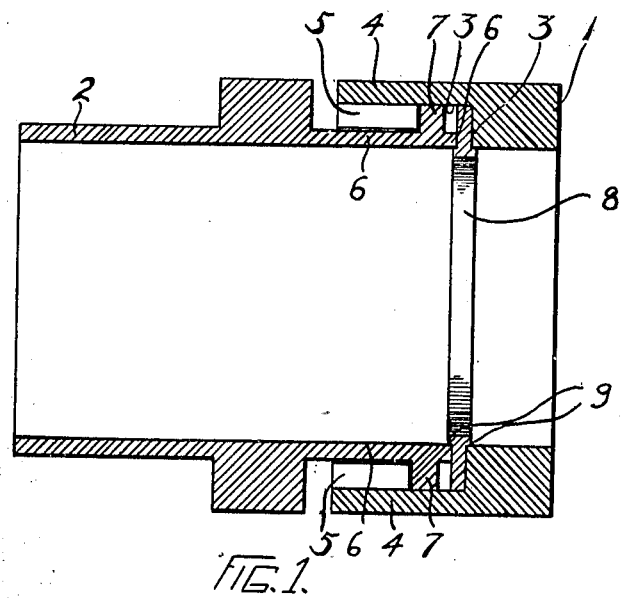
Figures 2, 3:
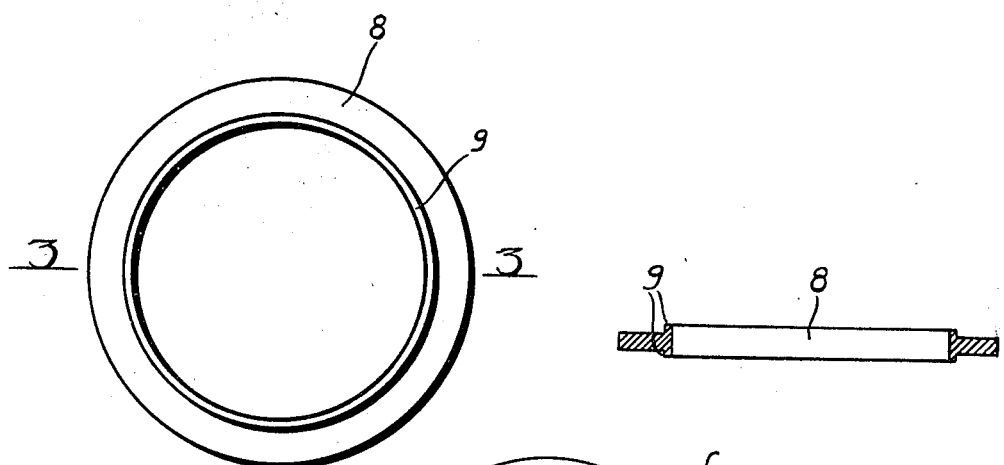
Figure 4:
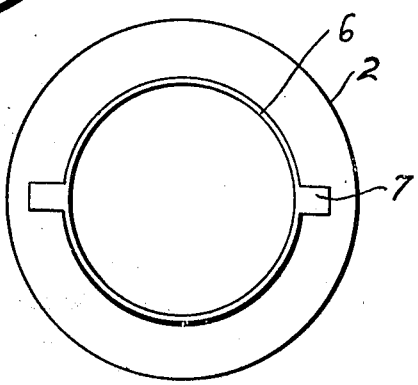

Throughout specification and drawing like numerals of reference will indicate corresponding parts, and in this drawing: Figure 1 is a central longitudinal section through a pipe coupling equipped with my washer, Fig. 2 is a plan view of the washer detached, Fig. 3 is a transverse section on line 3—3 of Fig. 2, and Fig. 4 is an end view of one of the pipe fittings illustrating particularly the locking lugs thereof.

I have indicated at 1 and 2 a pair of pipe sections. The section 1 is formed with an annular shoulder 3 providing a washer seat, and is further provided with an internal flange 4 having a pair of slots or gaps 5 therein. The adjacent section 2 is formed with a flange 6 having a pair of locking lugs 7 adapted to pass through the slots of the section 1 and lock beneath the internal flange 4 thereof.

I have indicated at 8 the body portion of my improved washer. Said body is formed upon its internal periphery with an annular web of a thickness slightly greater than the thickness of the body portion, to provide a pair of laterally extending flanges 9 projecting slightly beyond the external faces of the body on each side.

In use, the washer is seated upon the seat 3 of the section 1 and with one of its flanges 9 having a peripheral bearing upon the internal wall of said section below said seat. When the two sections are assembled, the lugs 7 on the flange 6 of the section 2 will pass through the gaps 5 of the section 1 and lock under the internal flange 4 thereof upon a slight rotation of one or the other of said sections in either direction. The other flange 9 of the washer will bear against the internal wall of the flange 6 of section 2. The internal pressure of the fluid transmitted through said sections will expand said washer flanges 9 against the walls thereof, thus insuring a positively watertight union for said sections. Inasmuch as one of the flanges of the washer has an internal bearing upon one of said sections, the two sections need not be brought tightly together, since the flange of the washer will prevent any escape of the fluid.

While I am aware that it is old to employ a plain annular rubber gasket or a comparatively solid metal gasket or a metal gasket having substantially the same physical properties as that of the connecting pipe sections in the coupling of a pair of pipe sections, yet so far as I am aware it is new to use a flexible washer having an internal web of a thickness substantially greater than the thickness of the body portion of the washer so that a pair of flanges will be left projecting laterally from each side thereof, which flanges will have a peripheral bearing on the internal walls of the pipe sections and will be expanded thereagainst by the internal pressure of the fluid conducted through said sections.

While I have shown and described my improved washer as applied to a pipe coupling, I do not wish to be understood as limiting myself to this use alone, as the invention is equally applicable to a hose coupling or any other fitting used in the transmission of fluids under pressure.

Various modifications in the construction and form of my invention, coming within its spirit and scope, may obviously be resorted to, if found within the limits of the appended claims.

What I therefore claim and desire to secure by Letters Patent is:

1. In combination with a coupling comprising a pair of loosely interlocking members having abutting ends, a packing washer comprising an annular web disposed between said abutting ends and having on each side of said annular web a flexible portion disposed wholly within said coupling and adapted to be pressed against the inner wall thereof by the pressure of the fluid in passing through the coupling.

2. In combination with a coupling comprising a pair of members having abutting ends, an uncompressed packing washer comprising an annular web having lateral flexible portions overlapping said abutting ends and adapted to be expanded radially into fluid-tight relation thereto by the pressure of the fluid passing through the coupling.

In testimony whereof I affix my signature in presence of two witnesses.

JOHN ISHERWOOD.

Witnesses:
VICTORIA LOWDEN,
MARION C. HOBBS.